Aug. 26, 1969     W. LOTTER ET AL     3,463,138
CONVECTION OVEN
Filed April 29, 1968     3 Sheets-Sheet 1
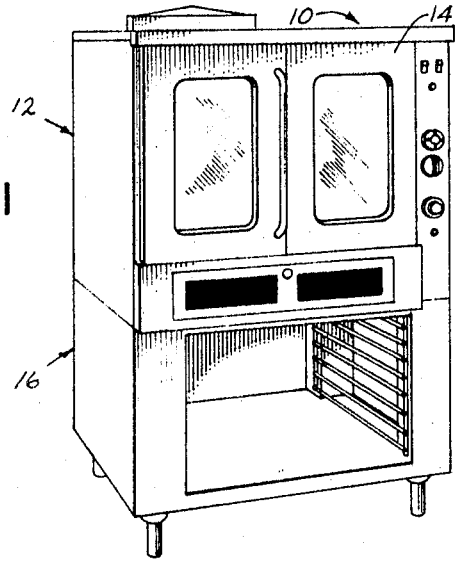
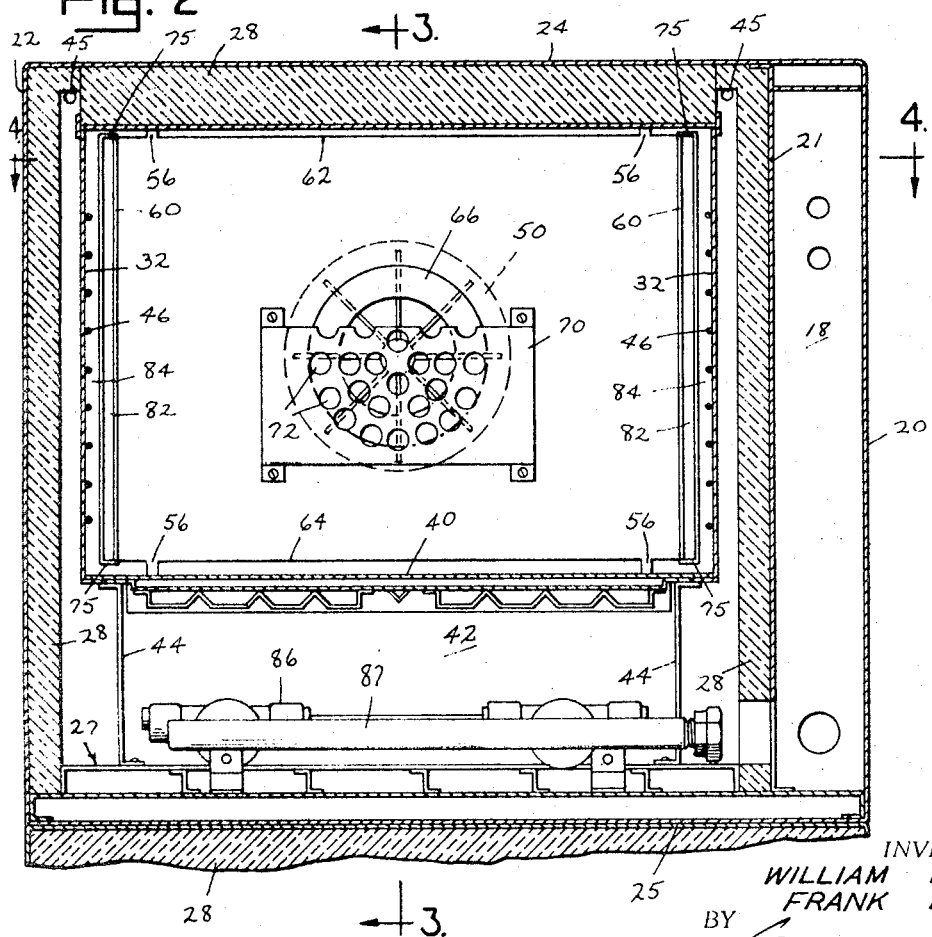
INVENTORS
WILLIAM LOTTER &
FRANK DE VOS
BY
*Eugene C. Kuthlock*
ATTORNEY

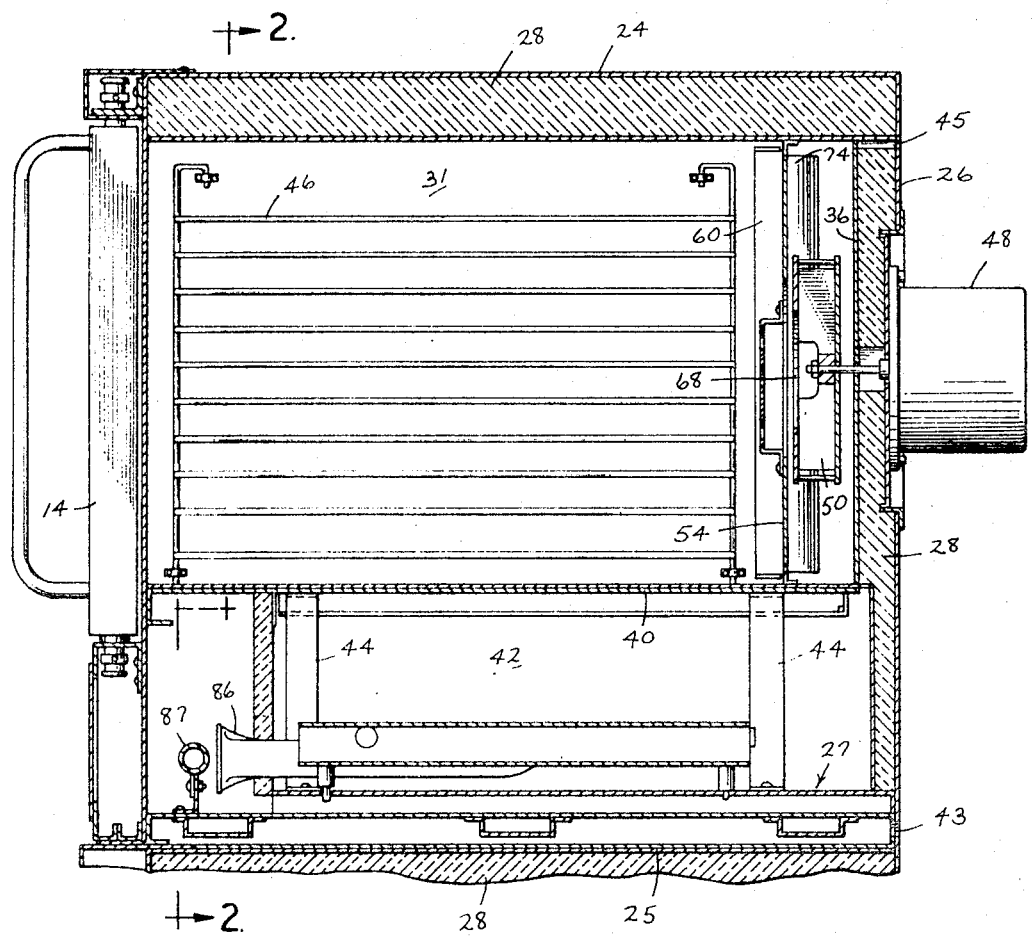

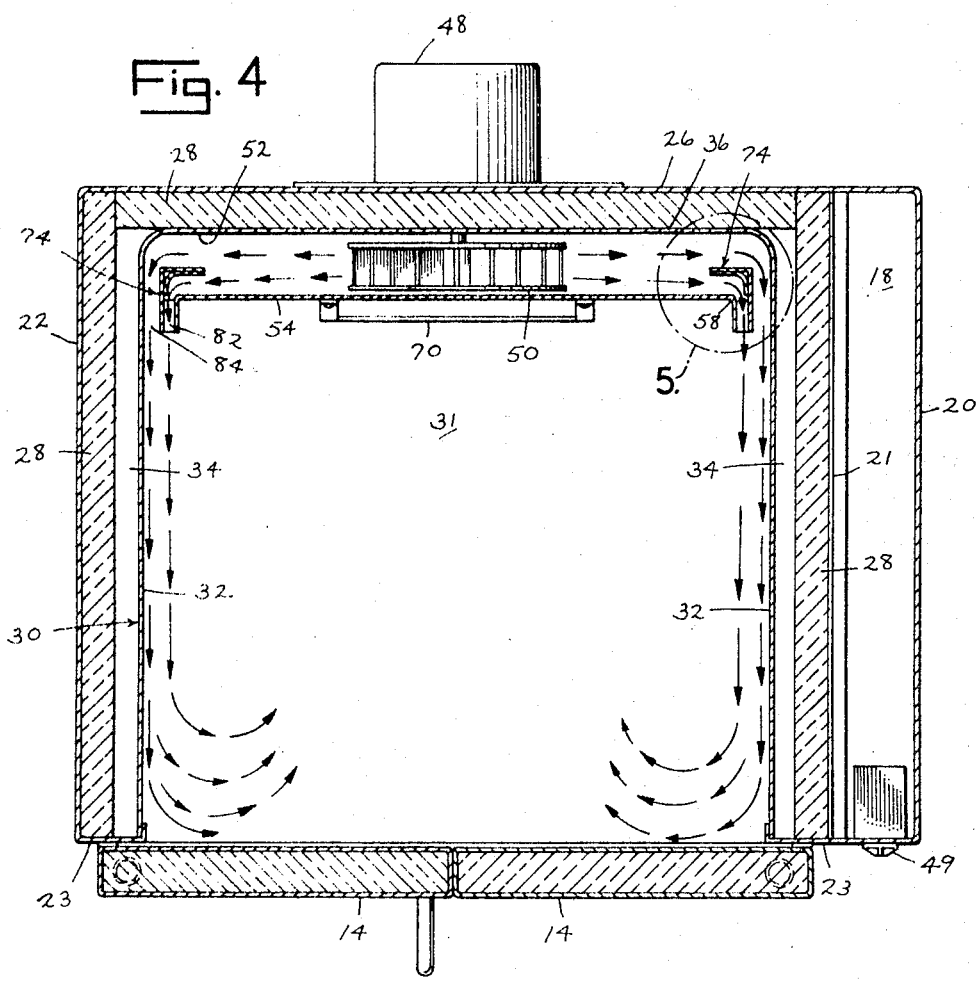
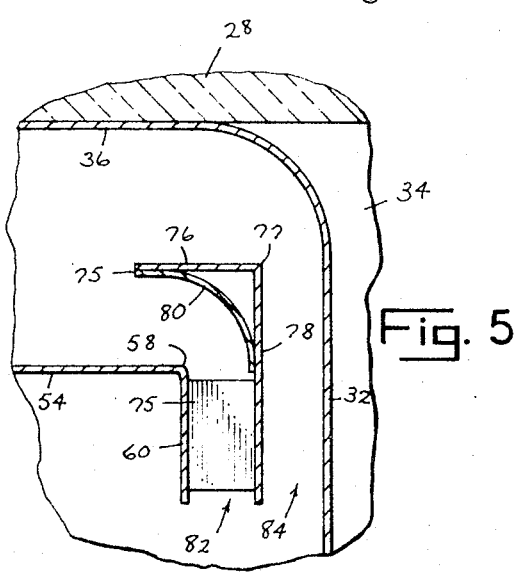

United States Patent Office 3,463,138
Patented Aug. 26, 1969

3,463,138
CONVECTION OVEN
William Lotter and Frank De Vos, South Bend, Ind., assignors to South Bend Range Corp., South Bend, Ind., a corporation of Indiana
Filed Apr. 29, 1968, Ser. No. 724,976
Int. Cl. A21b 1/26; F24c 15/32
U.S. Cl. 126—21                                    9 Claims

ABSTRACT OF THE DISCLOSURE

A convection oven having an inner housing defining a cooking chamber and a cabinet surrounding said housing including parts spaced from the bottom and side walls of the housing to form a continuous heat chamber therebetween. A heating means, such as gas burners, is disposed within said heat chamber. A baffle plate is spaced from and substantially parallel to the back wall of the inner housing. A blower is mounted in the housing back wall, having its fan positioned between said baffle plate and said wall. The side edges of said baffle plate are spaced from the opposite housing side walls and a deflector extends along each baffle plate side edge. Each deflector is spaced from said housing and said baffle plate so as to direct blower-impelled air around the baffle plate side edge and along the adjacent housing side wall where the air absorbs heat generated within the heat chamber from the side wall before it is turned into the center of of the cooking chamber by the front cabinet doors.

Summary of the invention

This invention relates to a convection oven wherein high velocity heated air is utilized for cooking and baking.

The convection oven of this invention includes an inner housing defined by top, bottom, back and side walls defining a cooking chamber and a cabinet surrounding said housing and including parts spaced from said housing bottom and side walls to form a continuous heat chamber therebetween. Heating means are disposed within said heat chamber and a baffle plate is spaced from and substantially parallel to said housing back wall. A blower is mounted in said housing back wall with its fan positioned between said baffle plate and said back wall. Said baffle plate has its sides terminating spaced from opposite inner housing side walls and has an enlarged aperture opposite said blower fan through which air may be drawn into said fan and centrifugally impelled behind said baffle plate. A deflector or baffle member extends along each baffle plate side margin and is spaced from said inner housing and said baffle plate so as to direct blower impelled air around the baffle plate side margins and along each housing side wall where the air absorbs heat generated within said heat chamber from the side wall.

Conventional convection ovens heretofore utilized are constructed with the top and back wall as well as the bottom and side walls spaced from the outer cabinet so as to provide a surrounding heat chamber for the oven inner housing. The convection oven of this invention utilizes a heat chamber which extends only along the sides and bottom of the oven. The top and back walls of the inner housing lie adjacent the top and back walls of the surrounding cabinet, thereby enlarging the volume of the oven cooking chamber and thus increasing the capacity of the oven in comparison to the capacity of a conventional convection oven having a similar sized outer cabinet.

Deflectors in this construction extend along the baffle plate side margins to cause the blower-impelled air to be directed around each side margin and substantially parallel along the adjacent side wall in two streams, one of which overlies the other. The air stream nearest the side wall contacts and flows over substantially the entire length of the inner surface of the side wall in a heat transfer relationship thereby absorbing a maximum amount of heat from the side wall. Upon reaching the front part of the inner housing, both streams of air are deflected or turned into the center of the cooking chamber and are dispersed over the food in the chamber.

Accordingly, it is an object of this invention to provide a convection oven having a cooking chamber of maximum capacity for a given sized outer cabinet.

It is another object of this invention to provide a convection oven in which the heat is uniformly distributed within the cooking chamber.

It is still another object of this invention to provide a convection oven having a high productive capacity for producing uniformly baked goods.

Other objects of this invention will become apparent upon a reading of the invention's description.

Brief description of the drawings

A preferred embodiment of this invention has been chosen for purposes of illustration and description wherein:

FIG. 1 is a perspective view of the convection oven of this invention.

FIG. 2 is a fragmentary vertical sectional view taken along line 2—2 of FIG. 3.

FIG. 3 is a fragmentary sectional view taken along line 3—3 of FIG. 2.

FIG. 4 is a sectional view taken along line 4—4 of FIG. 2.

FIG. 5 is an enlarged detail view taken within circle 5 of FIG. 4.

Description of the preferred embodiment

The preferred embodiment of this invention illustrated herein is not intended to be exhaustive or to limit the invention to the precise form disclosed. It is chosen and described in order to best explain the principles of the invention and its application and practical use to thereby enable others skilled in the art to best utilize the invention.

The convection oven unit 10 perspectively illustrated in FIG. 1 includes a cabinet 12 having an open front spanned by doors 14 which are hinged at opposite sides of the front margins 23 thereof. A rigid frame structure 16 supports cabinet 12 and may serve as the lower cabinet of a double deck oven or as a warming compartment. Cabinet 12 includes outer side walls 20 and 22, top wall 24, bottom wall 25 and back wall 26. An inner cabinet side wall 21 is positioned parallel to and spaced from outer side wall 20 forming a compartment 18 which contains the control elements of the oven. Cabinet side walls 21 and 22, top wall 24 and back wall 26 have suitable insulation material 28 mounted at their interior surfaces. Cabinet bottom wall 25 preferably has insulation material 28 mounted adjacent its exterior surface.

Disposed within cabinet 12 is an inner oven housing 30 defining a cooking or baking chamber 31. Housing 30 has side walls 32 which are spaced from the insulation material 28 adjacent the cabinet side walls 21 and 22 so as to form heat passages 34 therebetween, a back wall 36 and top wall 38 which preferably engage the insulation material 28 adjacent cabinet back wall 26 and top wall 24, and a bottom wall 40 which is spaced from bottom wall 25 of cabinet 12 so as to form a heating chamber 42 which openingly communicates with heat passages 34. Heating chamber 42 is vented to the atmosphere by conduit 43. A flue 45 is provided at the top of each heat passage 34. Inner housing 30 may be fixedly positioned within cabinet 12 by spaced vertical legs 44 each having one end secured to bottom wall 40 of inner housing 30 and the other end secured to frame support 27 secured to bottom wall 25 of cabinet 12. Oven rack guides or supports 46 may be secured to opposite side walls 32 of the inner housing.

A blower 48 is mounted in an opening in the back wall 36 of inner housing 30 preferably at its approximate center. Fan 50 of blower 48 is located within housing 30 adjacent and parallel to inner surface 52 of the back wall 36. Blower 48 may be electrically actuated by means of controls housed in control compartment 18 and having a manual actuator or switch 49.

A baffle plate 54 is located within inner housing 30 spaced forwardly of fan 50 and parallel to housing back wall 36. Baffle plate 54 may be positioned by integral brackets or tabs 56 which project from the top and bottom edges of plate 54 and which are secured at their free ends to the housing top wall 38 and bottom wall 40. The side portions of baffle plate 54 may be bent at 58 spaced from and parallel to side walls 32 of inner housing 30 to form flanges 60 which project forwardly from baffle plate 54. Each flange 60 may lie parallel to inner housing side wall 32, as shown in FIG. 5, or may be slightly angled toward wall 32. Top edge 62 and bottom edge 64 of baffle plate 54 are preferably spaced from and parallel to top wall 38 and bottom wall 40 respectively of inner housing 30. The spacing between baffle top edge 62 and housing top wall 38 and between baffle bottom edge 64 and housing bottom wall 40 is preferably less than the spacing between baffle flanges 60 and housing side walls 32 so that during operation of the blower 48 a greater portion of air is forced around the sides than around the top and bottom of the baffle plate 54.

Baffle plate 54 has a central aperture 66 which is located opposite the intake 68 of blower 48. A guardplate 70 having ventilation means, such as a plurality of small closely spaced apertures 72, is secured to the forward side of baffle plate 54 and at least partially overlies baffle aperture 66.

A vertically elongated deflector or corner baffle member 74 lies adjacent and parallel to the bend 58 of each baffle plate and is spaced between the baffle plate 54 and inner housing 30 so as to form two air flow passages 82 and 84 around each baffle bend 58. Each corner baffle member 74 may include a portion 80 having a concave face extending from behind the baffle plate 54 to a position opposite or alongside baffle plate flange 60, a portion 76 extending parallel to housing back wall 36 from the rear edge 75 of concave portion 80 toward proximate housing side wall 32, and a second portion 78 extending parallel to housing side wall 32 and forwardly from bent edge 77 of portion 76. Corner baffle member 74 may be positioned within housing 30 by a plurality of projecting brackets 75 secured at their free ends to the baffle plate 54. The corners of back wall 36 and side walls 32 of housing 30 are preferably rounded.

Gas burners 86 or other heating means are disposed within heating chamber 42 beneath inner housing 30. Burners 86 may be fed by natural or bottled gas through feed line 87 and are regulated by a thermostatic control (not shown) located within the cooking chamber 31 of the oven.

In operation, heat from burners 86 flows from heating chamber 42 up into side heat passages 34 adjacent side walls 32 of inner housing 30. Air is drawn by blower 48 from the center portion of the cooking and baking chamber 31 through aperture 66 in baffle plate 54 and enters and is discharged by the blower fan behind plate 54. Due to the difference in spacing between the edges of the baffle plate 54 and the top, bottom and side walls of the inner housing 30, more air may be forced around baffle bends 58 than around either of the top edge 62 or the bottom edge 64 of the baffle plate 54. The air forced toward baffle bends 58 contacts corner baffle member 74 and is divided into flow streams flowing through passages 82 and 84 formed between baffle plate 54 and inner housing 30.

Air which exits from each passage 84 follows in a substantially laminar stream the entire inner face of adjacent housing side wall 32 alongside the stream of air which exists simultaneously from each passage 82. In this manner, the outer stream of air from passage 82 forces the inner stream of fan blown air from passage 84 to closely follow the side wall of the inner housing whereby it absorbs heat which is conducted through and radiates from the side wall. Upon reaching the front of the inner housing the streams of air are turned or deflected rearward by the closed oven doors 14 into the center of the cooking chamber 31 and over the food goods where they may mix with the air issuing from around the top and bottom edges of baffle plate 54.

It will be understood that the invention is not to be limited to the details herein given but may be modified within the scope of the appended claims.

What we claim is:

1. In a convection oven having an inner housing defining a cooking chamber and including top, bottom, back and side walls, a cabinet surrounding said housing and including parts spaced from said housing bottom and side walls to form a continuous heat chamber therebetween, heating means disposed within said heat chamber, a baffle plate spaced from and lying substantially parallel to said housing back wall and having sides terminating spaced from said housing side walls, a blower having a fan positioned between said baffle plate and said housing back wall, said baffle plate having an aperture for passage of air to said blower fan, the improvement comprising a pair of deflectors spaced from and between said inner housing and said baffle plate, each deflector extending vertically adjacent a side marginal of said baffle plate to direct blower impelled air in two streams around the side margins of said baffle plate and along the adjacent housing side wall.

2. The convection oven of claim 1, wherein each deflector includes a portion having a concave face extending from behind said baffle plate to a position spaced laterally from the side margin of said baffle plate.

3. The convection oven of claim 2, wherein each deflector extends substantially the full height of said baffle plate.

4. The convection oven of claim 2, wherein said concave face portion has one margin thereof projecting forwardly of said baffle plate and substantially parallel to said adjacent housing side wall.

5. The convection oven of claim 2, wherein said concave face portion has one margin thereof projecting forwardly of said baffle plate and toward said adjacent housing side wall.

6. The convection oven of claim 2, wherein each deflector includes a first portion positioned substantially parallel to said housing back wall and extending from the rearward side margin of said concave face portion toward said adjacent side wall, and a second portion positioned substantially parallel to said adjacent side wall and extending forwardly from said first portion between said concave face portion and said adjacent side wall.

7. The convection oven of claim 1, wherein said baffle plate is spaced about its peripheral edges from said inner housing with the side edges of said baffle plate spaced a greater distance from said inner housing than the remaining peripheral edges of said baffle plate.

8. The convection oven of claim 1, wherein said baffle plate includes a side flange part projecting forwardly from each baffle plate side margin and substantially parallel to the adjacent housing side wall.

9. The convection oven of claim 1, wherein said baffle plate includes a side flange part projecting forwardly from each baffle plate side margin and toward the adjacent housing side wall.

References Cited

UNITED STATES PATENTS

| | | | |
|---|---|---|---|
| 3,118,436 | 1/1964 | Keating | 126—19 |
| 3,324,844 | 1/1967 | Huffman | 126—21 |

EDWARD G. FAVORS, Primary Examiner